Aug. 6, 1957 E. P. MOSLO 2,801,442
MOLDING MACHINE DIE PROTECTION MEANS
Filed Aug. 2, 1954
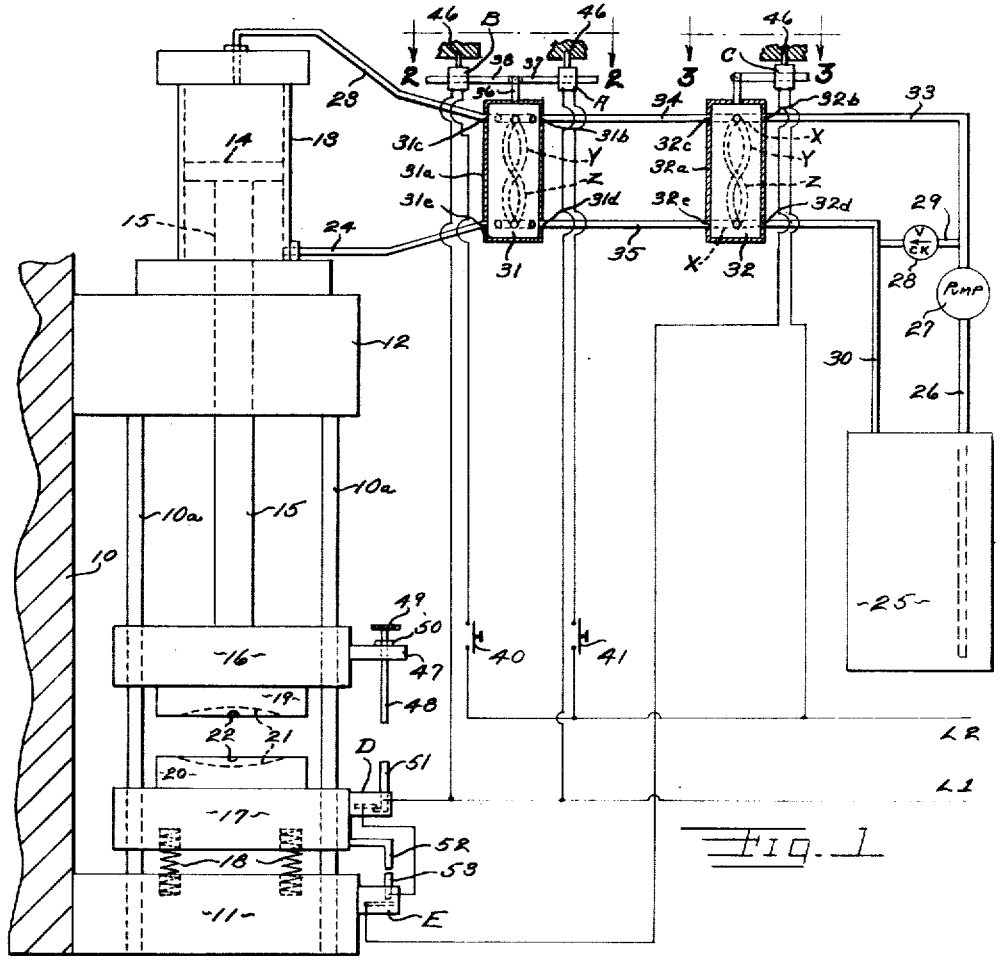
Fig. 1
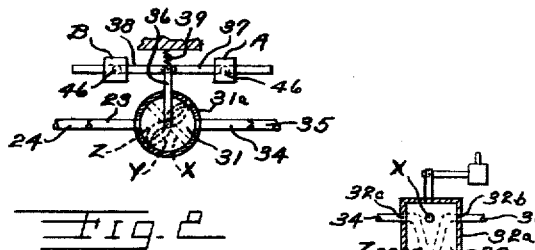
Fig. 2
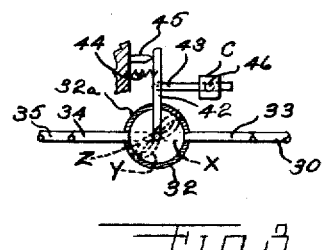
Fig. 3
Fig. 4
INVENTOR.
ERNEST P. MOSLO
BY
Hyde, Meyer, Baldwin & Doran
ATTORNEY United States Patent Office 2,801,442
Patented Aug. 6, 1957

2,801,442

MOLDING MACHINE DIE PROTECTION MEANS

Ernest P. Moslo, Cleveland, Ohio

Application August 2, 1954, Serial No. 447,277

6 Claims. (Cl. 18—16)

This invention relates to improvements in a molding machine and more particularly to controls for a machine of the type adapted to mold synthetic plastic material.

An object of the invention is to protect the die blanks, which form the mold of a molding machine from injury due to material contained between their mating surfaces during the molding operation when the die blanks are closed under pressure.

Another object of the invention is to provide a molding machine with novel control means for the protection of the die blanks.

Another object of this invention is to provide a molding machine with novel control means wherein the die blanks will be suddenly separated should any residue material or flashing be present between the mating surfaces of the die blank at the time of closing the mold under high pressure.

Still another object of the invention is to provide a molding machine with a simple, adjustable, precise mechanism and control whereby no injury can befall the die blanks under a closing operation involving high pressures.

Another object of the present invention is to provide a novel molding machine characterized by its structural simplicity, the ease of assembly of its parts, its strong and sturdy nature and its low manufacturing cost. Other features of the invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a diagrammatic view of a molding machine equipped with my novel control means.

Fig. 2 is a fragmental top view of one of the control valves taken along the line 2—2 of Fig. 1.

Fig. 3 is a fragmental top view of another control valve taken along the line 3—3 of Fig. 1.

Fig. 4 is a side elevational view of the valve of Figs. 1 and 3 turned clockwise through 45°.

It is well known in the plastic molding art that the die blanks forming the mold must have their mating surfaces completely free of any residue material or flashing during the molding operation. The presence of such material will cause an imperfect engagement between the mating surfaces and allow leakage during the injection of the plastic materials into the mold, thereby being wasteful of material and resulting in imperfect castings. However, of more serious consequence is the injury that may befall the die plate and other parts of the molding machine should any such foreign material be present between the mating surfaces of the die plates. Under normal operating conditions, the die blocks are brought together under extremely high pressures with precision-like movement. Any material contained between the die blanks will prevent the mating surfaces of the die blanks meeting in a common plane and thereby cause them to distort or become marred under high pressures. The molding machine is generally a rigid structure to maintain the precision-like movements of the coacting die blanks, and therefore liable to great damage when subjected to high pressures and distortion, which always results in expensive repairs, loss of production and inferior products.

The molding machine and control circuit which is shown in detail in Figs. 1 to 4 inclusive is completely free of the above-discussed shortcomings. It will be understood that this is a diagrammatic showing which has been simplified to clearly illustrate this invention. Fig. 1 comprises a main frame 10 upon which are rigidly mounted a lower base plate 11 and an upper end plate 12 a spaced distance therefrom. Parallel guide members 10a, of which there are commonly four, extend substantially the full length of the mold assembly and are rigidly held in place by the base plate 11 at one end and the upper end plate 12 at the opposite end. The upper end plate has rigidly secured to it a hydraulic cylinder 13 which houses a double acting piston 14 which actuates the depending piston rod 15 which has its lower end connected to an upper movable die plate 16 slidably mounted on the guide members 10a. The movable die plate 16 has a coacting lower die plate 17, also slidably mounted on the guide members 10a, and yieldingly urged away from the base plate 11 by a plurality of coil springs 18 secured in recesses contained in the lower face of the lower die plate 17 and the upper face of the base plate 11. A mold is formed by a pair of coacting die blanks 19 and 20 rigidly secured to the movable die plate 16 and lower die plate 17 respectively. A mold cavity is indicated at 21 and the injection opening where the plastic material enters the mold is indicated at 22 and comprises two complementary grooves on the mating surfaces of the die blanks. Those familiar with this art will understand that the nose of an injection nozzle (not shown) will fit tightly against the opening 22, when the die blanks are in an engaging position and injection is taking place.

For the purpose of actuating the piston 14 contained in cylinder 13, I have provided an hydraulic power circuit comprising upper and lower combined feed and return lines 23 and 24 respectively. A tank 25 acts as a reservoir for the hydraulic fluid used in the circuit. The feed lines are fed from this tank by line 26, pump 27, at any desired pressure. Spring pressed check valve 28 in by-pass 29 permits return of pressure fluid through line 30 to tank 25, to prevent excessive pressure in the system.

A pair of reversing valves 31 and 32 are provided in the hydraulic circuit. In Fig. 1, the valves are seen in side elevation and comprise an outer fixed cylindrical housing 31a, 32a, each of which has two diametrically opposed ports 31b, 31c; 32b, 32c in its side walls near its upper end and two diametrically opposed ports 31d, 31e; 32d, 32e near its lower end. The pressure fluid feed line 33 is connected to the port 32b and the return line 30 is connected to the port 32d of the sleeve member 32a. Line 34 connects ports 32c and 31b. Line 35 connects ports 31d and 32e. Rotatable within each housing is a cylindrical valve member 31 or 32 having a plurality of tubular passages providing communication between the upper and lower pairs of ports. Each cylindrical valve member is provided with a pair of diametrically extending passages X, and a pair of separate, cross, diagonally extending tubular passages Y and Z, as shown. The passages of valve 31 are normally in the position of Fig. 2 where no ports are connected. Movement of valve 31 counter-clockwise 45° from the position of Fig. 2 causes passages X to connect port 31b with 31c, and port 31d with 31e. Movement of valve 31 clockwise 45° from the position of Fig. 2 causes passage Y to connect port 31b with 31e, and port 31c with 31d.

The passages X of valve 32 normally connect port 32b with 32c, and port 32d with 32e as shown in Figs. 1 and 3. When turned clockwise 45° from the position of Fig. 3, passage Y connects port 32b with 31e, and port 31c and 31d, as shown in Fig. 4. Thus, it will be seen that valves 30 and 31 provide a quick and easy means for reversing the direction of pressure flow through the hydraulic circuit.

It should be understood that the purpose of reversing the hydraulic circuit at any given time, is to cause a reversal in the direction of reciprocatory movement of the piston 14, which movement is transmitted to the movable die plate and die blank 16 and 19 respectively through piston rod 15. For the purpose of oscillating the cylindrical valve members about their axes, I have provided electronically controlled solenoids; however, it is to be understood that any other suitable means may be used. As seen in Fig. 1, the upper end of the cylindrical valve 31 is provided with a crank arm 36 having pivotally connected thereto a pair of horizontally extending bars 37 and 38, as seen in Fig. 2, which form movable armatures for opposed solenoids A and B respectively. A coil centering spring 39 having one end secured to a supporting surface and its other end secured to crank arm 36, normally maintains the cylindrical valve 31 in neutral position as seen in Fig. 2, wherein the circuit is completely closed. Energization of solenoid A moves valve 31 clockwise 45° from the position of Fig. 2. Energization of solenoid B moves valve 31 counterclockwise 45° from the position of Fig. 2. A starter button 40 is electrically connected to a suitable power source L1, L2 and also with solenoid B; depressing said starter button energizes solenoid B and causes fluid to flow from pump 27 through line 33, valve 32, line 34, valve 31 and line 23 to the upper end of cylinder 13 to cause closing action of platens 16 and 17. Return flow is through lines 24, 35 and 30. A reversing button 41, also electrically connected with power source L1, L2 and solenoid A, energizes solenoid A when depressed, causing fluid to flow from pump 27 through line 33, valve 32, line 34, valve 31 and line 24 to the lower end of cylinder 13 to cause opening movement of platen 16. Return flow is through line 23, valve 31, line 35, valve 32 and line 30. Usually closing button 40 will start a timer (not shown) which will energize solenoid A at the end of the timing period.

Cylindrical valve 32 operates in much the same way as valve 31. The upper end of valve 32 is provided with a crank arm 42 as seen in Figs. 1, 3 and 4 having a bar 43 pivotally connected thereto and forming an armature for a solenoid C mounted near its outer end. A retaining coil spring 44 having one end connected to a supporting surface and its other end connected to crank arm 42 normally maintains the cylindrical valve 31 against stop 45, as seen in Fig. 3. Energization of solenoid C (per switch means hereinafter explained) causes the cylindrical valve member 31 to rotate about 45° in a clockwise direction as viewed in Fig. 3. The solenoids A, B and C are given pivotal trunnion mountings as indicated at 46 to allow for the angular movements of arms 36 and 42 as above described.

As heretofore explained, a novel feature of this invention resides in the provision of means for reversing the downward movement of the movable die plate 16 in the presence of material contained between the mating surfaces of the die blanks 19 and 20. For this purpose, I have provided a pair of micro-switches D and E, both of whose contacts must be closed before energization of solenoid C of cylindrical valve 31 takes place, which thereafter results in a reversing of the directions of movement of plate 16. Micro-switch D is secured to the right side, as viewed in Fig. 1, of the lower die plate 17, which is yieldingly mounted on base plate 11 by means of coil springs 18. The contacts of micro-switch D are normally in a closed position, as shown in Fig. 1 and are connected with a suitable electric power source L1. The micro-switch E is positioned on the right side of base plate 11, as viewed in Fig. 1, and normally has its contacts in an open position, as seen in Fig. 1. Micro-switch D is connected through solenoid C through the contact of micro-switch E and only by having both sets of contacts in switches D and E closed in series can the power from source L1 be transmitted to energize solenoid C with a return line to the other side of the circuit L2. A horizontally extending bracket 47 is provided on the right side of movable die plate 16 and is threadedly engaged by an adjustable rod 48 which extends vertically therethrough and carries a fine thread. The rod 48 is provided with a knurled head 49 for manipulation. A lock nut 50 is provided on the rod and retains the rod in any selected position of adjustment. Microswitch D has a vertically extending arm 51 integrally connected to the lower one of its contacts. The upper end of this arm is positioned to lie in approximately the same plane as the upper surface of the lower die blank 20. The lower end of rod 48 is adjusted to just strike arm 51 of micro-switch D only in the absence of any foreign material between the mating surfaces of the die blank members 19 and 20. In other words, the rod 48 will strike the arm 51 of switch D only when the mating surfaces of the die blank members are in complete engagement. In actual practice, a piece of paper between blocks 19 and 20 will prevent opening of the contacts of switch D. Actuation of arm 51 of micro-switch D opens the contacts of switch D and thereby disconnects micro-switch E from the power source L1, which has the effect of disabling switch E. Under such conditions, wherein no residue or flashing is present between the mating surfaces of the respective die blanks, the movable die plates and die blanks continue their downward reciprocation, moving with them the lower die plate 17 and die block 20 to a position wherein the lower surface of the lower die plate 17 abuts or rests upon the upper surface of base plate 11. At this point, the die blank members 19 and 20 are held together under extremely high pressure and the plastic material is then injected through the opening 22 in a known manner.

Assume now that residue or flashing were present between the mating surfaces of the die blank members, preventing the die blanks from completely engaging one another and thereby also preventing rod 48 from striking arm 51 of micro-switch D. The contacts of micro-switch D therefore remain closed as seen in Fig. 1 and do not disable micro-switch E. The right-hand side of the lower die plate 17 is seen to have an outwardly and downwardly extending member 52 near its lower end. The lower end of the member 52 is adjusted to contact a vertically upwardly extending arm 53 integrally connected with the contacts of micro-switch E, and so adjusted as to strike arm 53 immediately upon downward movement of the lower die plate 17. Moving the vertically extending arm 53 of micro-switch E downwardly closes the contacts of micro-switch E and completes the circuit from L1 to L2 through solenoid C. Thus, having explained that micro-switch D is not actuated by rod 48 when residue or flashing is contained between the die blanks, further downward reciprocation of the movable die blank 19 causes the lower die blank 20 and lower die plate 17 to move downwardly, which in turn causes the arm member 52 to strike the vertically upwardly extending arm 53 of micro-switch E which in turn closes switch E completing the circuit and energizing solenoid C. Upon being energized, solenoid C causes the cylindrical valve member 32 to rotate in a clockwise direction as heretofore explained to the position of Fig. 4 and has the effect of immediately reversing the direction of the hydraulic circuit, which in turn reverses the downward reciprocatory movement of the piston 14. Flow of pressure fluid is then from pump 27 through 33, passage Y of valve 32, 35, passage X of valve 31 and through 24 to the lower face of piston 14. The return line is through 34, passage Z of 32, and 30 back to tank 25. The reversal of the downward movement of piston 14 causes removal of all pressure upon the lower die blank 20 by the immediate withdrawal upwardly of the movable die blank 19. In actual practice, this reversal occurs after platen 17 has travelled about one-half the distance to plate 11.

As stated previously, if no foreign material lies between mating flat surfaces of blocks 19 and 20, the closing action of the press continues and switch E closes as 17 approaches 11, but no reversal of piston 14 occurs because the contacts of switch D are open.

The operation of my device should now be apparent from the above description. Depressing starter button 40 causes energization of solenoid B, which in turn rotates cylindrical valve 31 to a position wherein passages X connect the hydraulic circuit in such a manner that the pressure is directed downwardly upon piston 14 causing the piston and movable die plate and die blank 16 and 19 to move downwardly. If no residue material or flashing is contained between the mating surfaces of the movable die blank members, the movable die plate will move downwardly bearing with it lower die plate and die blank members 17 and 20 until they abut upon the base plate 11. After the mold has been closed long enough under pressure for plastic material which has been injected to become set, the operator (or a timer, not shown) closes the reverse button 41 which energizes solenoid A and causes cylindrical valve member 31 to rotate in a clockwise direction, as viewed in Fig. 2, which has the effect of immediately reversing the hydraulic circuit so that pressure is applied upon the lower surface of piston 14 causing the piston to move upwardly, carrying with it the movable die plate and movable die blank members. If flashing or residue had been contained between the mating surfaces of the die blank members upon the downward reciprocal movement of the piston and die plate 16 and die 19, solenoid C would have been energized by the closing of micro-switches D and E in series (as heretofore described) and the cylindrical valve 32 would have been rotated in a clockwise direction as viewed in Fig. 3, causing an immediate reversal in the direction of flow in the hydraulic circuit, and resulting in piston 14 suddenly moving upwardly, carrying with it the movable die plate and die blank members 16 and 19 respectively and thereby automatically preventing any damage resulting to the components of the molding machine.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible of certain changes fully comprehended by the spirit of the invention.

What I claim is:

1. In combination a molding machine including a main frame, parallel guide means extending between spaced end plates, a die plate yieldingly secured to and normally spaced from one of said end plates, a movable die plate mounted for reciprocation on said guide means, a die blank secured to each of said die plates, said die blanks in mating engagement forming a mold having a plastic injection gate, a power actuated cylinder and piston device mounted on one of said end plates and having a piston rod connected with said movable die plate to impart a reciprocating motion to said movable plate, a control circuit when closed having operating connections for reversing the downward movement of said movable die plate in the presence of material between the mating surfaces of said die blanks including a first and a second switch electrically connected in series and both of which must close prior to said control circuit becoming operative, said first switch having normally closed contacts when the surfaces of said die blanks are in non-mating position, means operable through downward movement of said movable die plate actuating said first switch and thereby opening the contacts of said first switch only when said die blank surfaces are in mating engagement, means operable through yielding movement of said yieldably secured die plate under pressure of said movable die plate closing the normally open contacts of said second switch, actuation of said first switch disabling said second switch, means for causing opening of said first switch when foreign material is present between said mating surfaces, and closing of said second switch to movement of said first named die plate toward said one end plate causing said control circuit to be closed, thereby resulting in a sudden retraction of said piston rod and separation of said die blanks.

2. In combination a molding machine including a main frame, guide means extending between spaced end plates, a die plate yieldingly secured to one of said end plates, a movable die plate mounted for reciprocation on said guide means, a die blank secured to each of said die plates, said die blanks in mating engagement forming a mold, a cylinder and piston device mounted on one of said end plates and having a piston rod connected with said movable die plate to impart a reciprocable motion to said movable plate, a control circuit for reversing the downward movement of said movable die plate in the presence of material between the mating surfaces of said die blanks, a first and second switch both of which must close prior to said control circuit becoming operative, said first switch having closed contacts when the surfaces of said die blanks are in non-mating position, means operable through downward movement of said movable die plate actuating said first switch and thereby opening the contacts of said first switch when said die blank surfaces are in mating engagement, means operable through yielding movement of said yieldably secured die plate under pressure of said movable die plate closing the contacts of said second switch, actuation of said first switch disabling said second switch, said first switch being inactive when material present between said mating surfaces, response of said second switch to yielding movement of said yieldable die blank closing said contacts of said second switch causing said control circuit to be closed, thereby resulting in a sudden retraction of said piston rod and seperation of said die blanks.

3. In combination a molding machine including a main frame including guide means extending between spaced end plates, a die plate yieldingly secured to one of said end plates, a movable die plate mounted for reciprocation on said guide means, a die blank secured to each of said die plates, said die blanks in mating engagement forming a mold, a power device mounted on one of said end plates and having connection with said movable die plate to impart a reciprocable motion to said movable plate, a control circuit for reversing the closing movement of said movable die plate in the presence of material between the mating surfaces of said die blanks, switch means operable through closing movement of said movable die plate when foreign material is present between said mating surfaces, said switch means being operative throughout the entire closing movement of said movable die plate, said switch means being rendered inoperative only when said die plates enter into mating engagement, said switch means operatively connected with said power device for causing a sudden retraction of said connection and separation of said die blanks.

4. In combination a molding machine including a main frame, parallel guide means extending between spaced end plates, a die plate yieldingly secured to one of said end plates, a movable die plate mounted for reciprocation on said guide means, a die blank secured to each of said die plates, said die blanks in mating engagement forming a mold having a plastic injection opening, a power actuated cylinder and piston device mounted on one of said end plates and having a piston rod connected with said movable die plate to impart a reciprocable motion to said movable plate, a control circuit for reversing the downward movement of said movable die plate in the presence of material between the mating surfaces of said die blanks, a first control switch in said circuit responsive to material between said mating surfaces, a second control switch in said circuit, responsive to actuation of said first switch, means actuating said first switch on closing engagement of the mating surfaces of said movable die plate in the absence of material contained between said mating surfaces, said means remaining responsive to actuate said first switch throughout the entire period of downward movement of said movable die plate, said second switch disabled by actuation of said first switch, said first switch remaining inactive in the presence of material between said mating surfaces, whereby slight further downward movement of said movable die plate closes said second switch thereby closing said control circuit causing said piston to be suddenly moved upwardly carrying with it said movable die plate.

5. In an injection molding machine, comprising a main frame, coacting die blanks mounted on said main frame, means for advancing and retracting one of said die blanks, control means for said advancing and retracting means, means operatively connected between said coacting die blanks and operatively connected with said control means to cause reversal of said first named means from an advancing movement to a retracting movement of said one die blank, said last named means responsive to material contained between the mating surfaces of said die blanks throughout the entire period of said die blank advancement, said last named means being rendered inoperative only at the time said die blanks enter into engagement with each other.

6. In a molding machine including a frame and an end plate, a first die plate mounted on said frame for limited movement toward and away from said end plate, yieldable means normally urging said first die plate away from said end palte, a movable die plate mounted on said frame for die opening and closing movement toward and away from said first die plate, said die plates adapted to carry mating die blanks on their facing surfaces and forming when in mating engagement a die cavity; and power means operatively connected with said movable die plate for causing its movement into and out of die closing position; the combination therewith of a control circuit for said power means for causing die opening movement of said movable die, said circuit including in series a normally closed controlled and a normally open circuit controller, said normally closed circuit controller including parts positioned on said first and movable die plates respectively, said parts dimensioned to open said normally closed controller only when said die plates are in die cavity closing position, said normally open circuit controller including parts positioned on said first die plate and on said frame, and said last named parts dimensioned to close said normally open controller only after closing of said die cavity followed by movement of said first die plate toward said end plate against the urging of said yieldable means.

References Cited in the file of this patent

UNITED STATES PATENTS

| | | |
|---|---|---|
| 2,372,833 | Jobst | Apr. 3, 1945 |
| 2,444,339 | Dinzl | June 29, 1948 |
| 2,649,943 | Meyers | Aug. 25, 1953 |
| 2,697,253 | Kruft | Dec. 21, 1954 |

UNITED STATES PATENT OFFICE

CERTIFICATE OF CORRECTION

Patent No. 2,801,442                                              August 6, 1957

Ernest P. Moslo

It is hereby certified that error appears in the printed specification of the above numbered patent requiring correction and that the said Letters Patent should read as corrected below.

Column 8, line 15, for "closed controlled" read -- closed circuit controller --.

Signed and sealed this 19th day of November 1957.

(SEAL)
Attest:

KARL H. AXLINE
Attesting Officer

ROBERT C. WATSON
Commissioner of Patents